United States Patent Office 3,341,509
Patented Sept. 12, 1967

3,341,509
POLYMERIZATION OF POLYOLEFINS
Peter L. Stang, Ewingville, N.J., assignor to United Aircraft Corporation, East Hartford, Conn., a corporation of Delaware
No Drawing. Filed Nov. 24, 1965, Ser. No. 511,287
5 Claims. (Cl. 260—94.2)

This invention relates to the polymerization of polyolefins and more particularly to a process whereby polymerization of fully polymerized polyolefins can be reinitiated by the addition thereto of a curing agent comprised of alkali metals or alkali metal compounds. This application is a continuation-in-part of my co-pending, co-assigned patent application S.N. 270,322 filed Apr. 3, 1963.

In the fabrication of solid rocket propellant grains the grain generally consists of a polymeric binder and various high energy additives such as active metals or metal hydrides. Unfortunately, it is known that the various curing agents used to cure the binder into its tough, rubbery form are highly reactive with the active metal and active metal hydrides and interreact therewith producing gas pockets and other voids within the cured polymer structure. It is, however, essential that the final grain be free from any such voids so that the burning rates can be constant and that the grain has maximum strength. The process of this invention can produce a tough rubbery polymer from an initially completely polymerized liquid resin without the addition of any of the reactive curing agents previously required and produces a void-free polymer fuel matrix having the necessary characteristics of strength and controlled burning rate.

While this invention has particular utility in the field of rocket propellants, it also has broader utility in the general field of polymerization where it is desirable to produce a cured polymeric material.

It is, accordingly, the primary object of this invention to provide a process for reinitiating polymerization in liquid polyolefin polymers chain propagation of which has previously been completed.

It is another object of this invention to provide a novel class of curing agents for hydroxy-terminated polyolefins.

It is another object of this invention to provide a method for producing a tough rubbery polymer from a liquid polyolefin polymer.

These and other objects of the invention will be readily apparent from the following description.

It has been found that polyolefin polymers with terminal OH groups can be cured merely by the addition of alkali metals, their hydrides or organometallic compounds thereto followed by curing at predetermined temperature for various periods of time. The temperature and time of cure are interrelated and the cure time required decreases as the temperature of cure is increased. Thus, although there is no criticality in the temperatures chosen, they should be selected so that the cure is completed within a reasonable and practical time. For example, cures may be obtained at 70 F., but such cures require times in the order of several days, whereas at temperatures of about 100° F., cure occurs in about 18 hours. Suitable curing agents include the alkali metals such as metallic lithium, sodium, and potassium, their hydrides such as LiH, LiAlH$_4$, NaH, KH and their organometallic compounds such as butyl lithium and butyl sodium and butyl potassium. This list is not all inclusive and, for example, other materials including the heavier alkali metals and their compounds can be used. The essential characteristic being that the curing agent employed when added to the polyolefin will produce reactive alkali metal in the mixture. It has been found that lithium and lithium compounds are the preferred curing agents. Suitable polyolefin compounds include both polybutadienes and polyisoprenes containing hydroxyl groups on the chains at the terminal positions and having molecular weights up to about 3,000 and room temperature viscosities up to approximately 300 poises. This range is particularly useful in formulation of propellant grains, but higher molecular weight polymers also can be cured according to this invention. Such polymers have the general structural formulas shown below and are readily available commercially, $n$ being in the range of about 20–100.

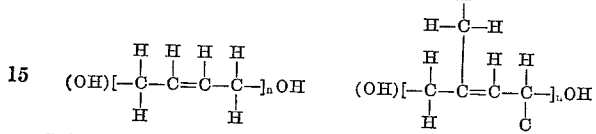

Suitable polybutadienes included BD–R–15 and BD–R–45 available from Sinclair Petrochemicals and suitable polyisoprenes include AVII-20 manufactured by Texas Butadiene.

The amount of alkali metal required can vary from a minimum of about 2 percent by weight of the mixture to a maximum of approximately 60 percent. Above about 60 percent, the cure still occurs, but some of the solids are rejected from the curing mixture and the strength of the cured polymer tends to decrease due to the imperfections formed in the cured polymer. If materials other than alkali metal are used, such as, for example, lithium hydride, lithium aluminum hydride or butyl lithium, a larger amount of material is required than when using metallic lithium. Since it is the alkali metal that is the effective curing agent, if the above materials are used instead of metals per se, the alkali metal component of the materials must react with the polymer and this metal component is the agent that effects the cure. The minimum weight necessary for the use of the lithium compounds is equal to the equivalent weight of the material necessary to produce at least about 2 percent of reactive lithium in the mixture.

The exact mechanism of cure has not been completely established but from a consideration of the time involved and the evolution of hydrogen that is noted after mixing, a condensation reaction rather than a free radical mechanism is suggested.

While not being limited thereto, the following reaction mechanisms appear consistent with existing observations:

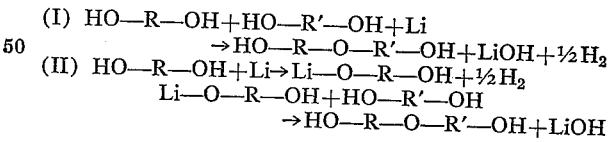

Since the alkali metals and their compounds according to this invention are very reactive, it is necessary to carry out the mixing in an inert atmosphere. Commercially available argon has been found satisfactory since its dew point is sufficiently low so that the curing agent will act as a getter for the remaining water and form an inert filler in the solid polymer. Generally, the procedure followed in preparing these compounds is to weigh out the desired amount of curing agent into a mixing vessel maintained under an inert atmosphere, add the liquid polyolefin and mix the two in an inert atmosphere. The polyolefin is then cast into the desired form, still under an inert atmosphere. It is preferable to maintain the inert atmosphere at all steps, but once the solids have been wetted by the polyolefin, they are relatively safe to handle in ambient atmospheres since only a negligible amount of oxidation appears to take place at the surface of the mixture. The curing agents used are preferably finely divided and although larger diameter particles may be used, it is preferable that 90 percent of the particles be under 20 microns in diameter.

TABLE 1

| No. | Lithium, percent by Wt. | Hydride, percent by Wt. | Liquid Polymer, percent by Wt. | (° F.) Cure Temp. | (Hrs.) Cure Time | Remarks |
|---|---|---|---|---|---|---|
| 1 | 2.02 | None | 93.28 BD-R-15, 4.72 Mineral Oil. | 140 | 18 | Very pliable; void free. |
| 2 | 10.23 | do | 89.77 BD-R-15 | 140 | 18 | Soft and pliable. |
| 3 | 18.77 | do | 81.23 BD-R-15 | 140 | 18 | Do. |
| 4 | 52.96 | do | 47.04 BD-R-15 | 140 | 18 | Tough, void free. |
| 5 | 34.12 | do | 65.88 BD-R-15 | 140 | 18 | Do. |
| 6 | 14.38 | do | 85.62 BD-R-15 | 140 | 18 | Do. |
| 7 | None | 6.72 LiAlH₄ | 93.28 BD-R-15 | 160 | 72 | Soft and pliable. |
| 8 | 3.00 | 10.00 LiAlH₄ | 87.00 BD-R-15 | Ambient 104 | 72 72 | No cure. Tough and pliable; void free. |
| 9 | 10.00 | 10.00 LiAlH₄ | 80.00 | Ambient 104 | 72 72 | No cure. Tough and pliable; void free. |
| 10 | None | 50.00 LiH | 50.00 | 104 | 18 | Tough and pliable; void free. |
| 11 | 10.00 | None | 90.00 AVII-20 | 140 | 18 | Tough and rubbery. |
| 12 | 5.55 | do | 81.50 BD-R-14, 12.95 Mineral Oil. | 140 | 18 | Very pliable; void free. |
| 13 | 60.00 | do | 40.00 AVII-20 | 140 | 18 | Tough and rubbery. |

In cases where the alkali metal is shipped in a mineral oil or other material, it may be desirable to filter the metal in a dry box and wash with pentane to prepare it for use in this process. Also, some of the liquid polyolefins contain water which, in such cases, must be removed by conventional techniques such as azeotropic distillation.

The preceding table describes various representative compositions cured according to the above described method.

The above method of preparing the polymer is particularly useful with respect to the formulation of a propellant grain. However, the tough, rubbery cured polymer formed herein can also be used in other applications. For example, if it is desired to use the cured polymer as a coating material, the article to be coated could be sprayed or dip-coated with the mixture of the polyolefin and lithium and then the coated article cured for the desired period of time to provide a tough, rubbery strongly-adherent coating thereon. In such a process the lithium would be kept to a minimum and could be utilized in coating cans or other containers, for example.

While this invention has been disclosed with respect to specific examples thereof, these examples are illustrative and should not be construed as limiting of the invention. The invention is limited only by the following claims wherein

I claim:

1. A method for increasing the molecular weight of a liquid hydroxyl terminated polyolefin polymer, which comprises adding to said polymer a curing agent selected from the group consisting of alkali metals, alkali metal hydrides and organo-alkali metallic compounds, said material being present in an amount sufficient to yield at least 2% of reactive alkali metal in said polymer, mixing said polymer and said material to uniformly distribute said material through said polyolefin and curing the mixture at a temperature of at least about 70° F.

2. The process according to claim 1 wherein said polyolefin is selected from the group consisting of hydroxyl terminated polybutadiene and hydroxyl terminated polyisoprene.

3. The process of claim 1 wherein said curing agent is lithium.

4. The process of claim 1 wherein said curing agent is sodium.

5. The process of claim 1 wherein the temperature is at least about 100° F.

References Cited

UNITED STATES PATENTS

| 3,055,952 | 9/1962 | Goldberg | 260—94.7 |
| 3,119,800 | 1/1964 | Moss et al. | 260—80 XR |
| 3,175,997 | 3/1965 | Hsieh | 260—94.7 |

JOSEPH L. SCHOFER, *Primary Examiner.*

BENJAMIN R. PADGETT, *Examiner.*

L. A. SEBASTIAN, H. I. CANTOR, F. HAMROCK,
*Assistant Examiners.*